Dec. 16, 1952     R. C. MONTANUS ET AL     2,621,552
MACHINE TOOL CONSTRUCTION
Filed July 14, 1949     5 Sheets-Sheet 1
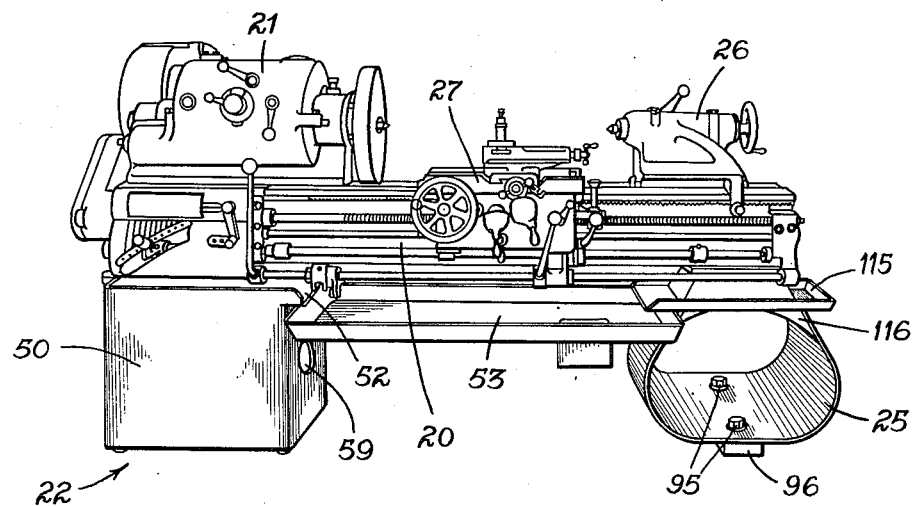
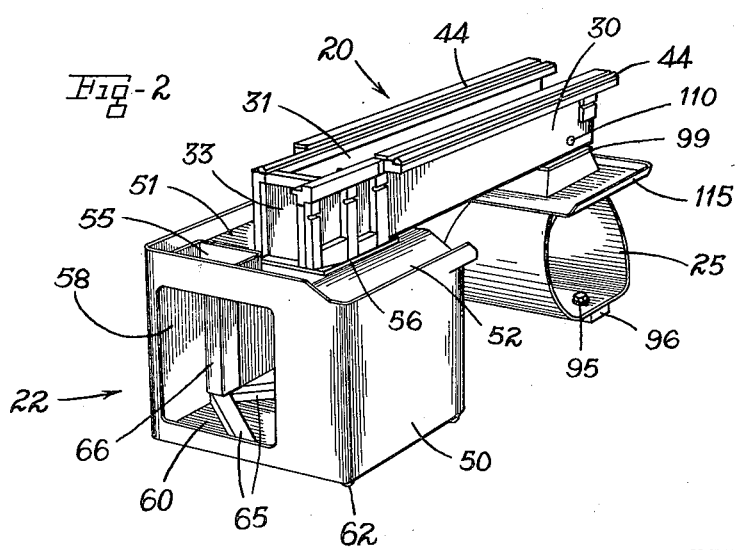
INVENTORS
Richard C. Montanus,
Rory H. Mumma, &
BY Robert H. Davies
Marechal & Biebel
ATTORNEYS

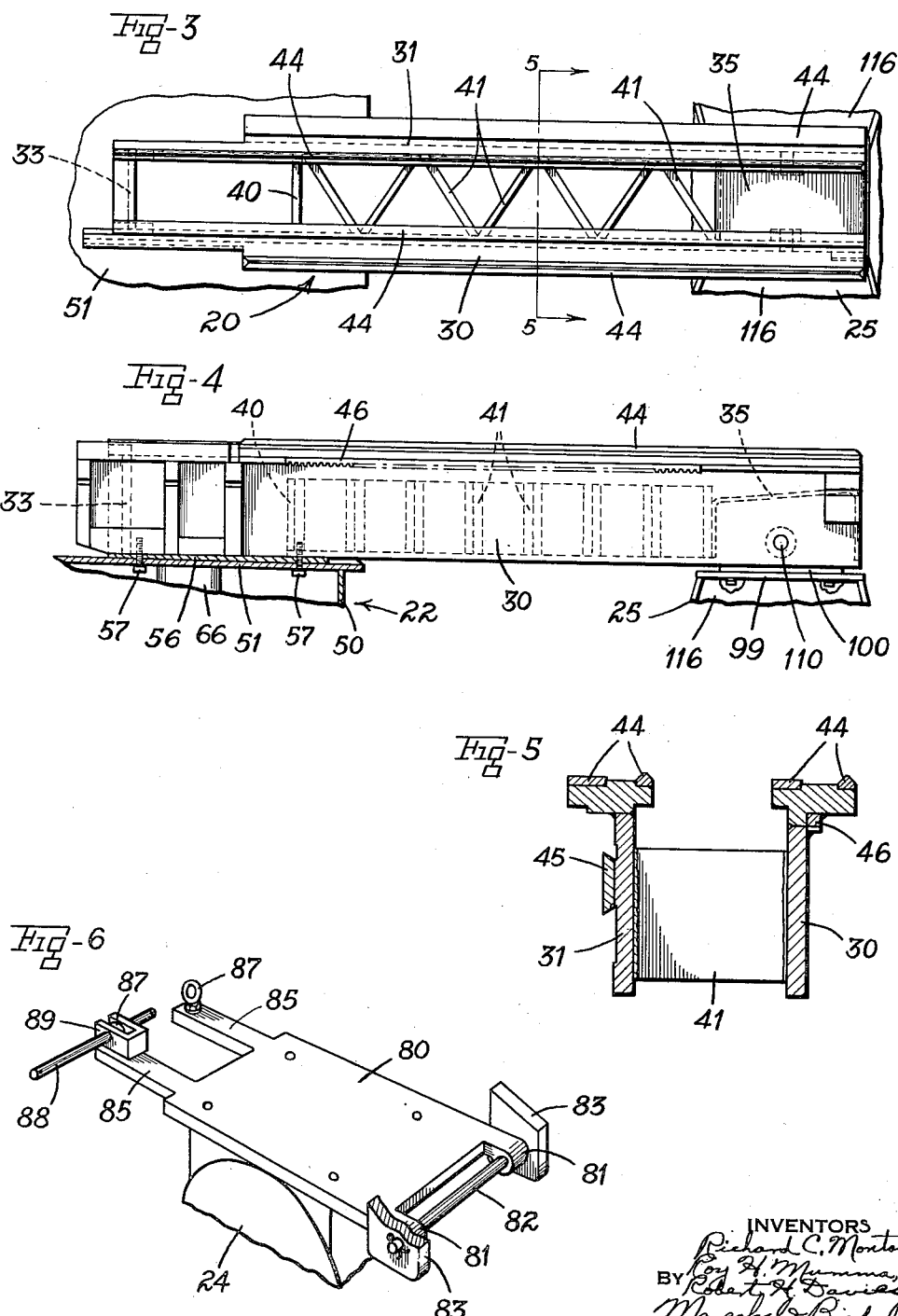

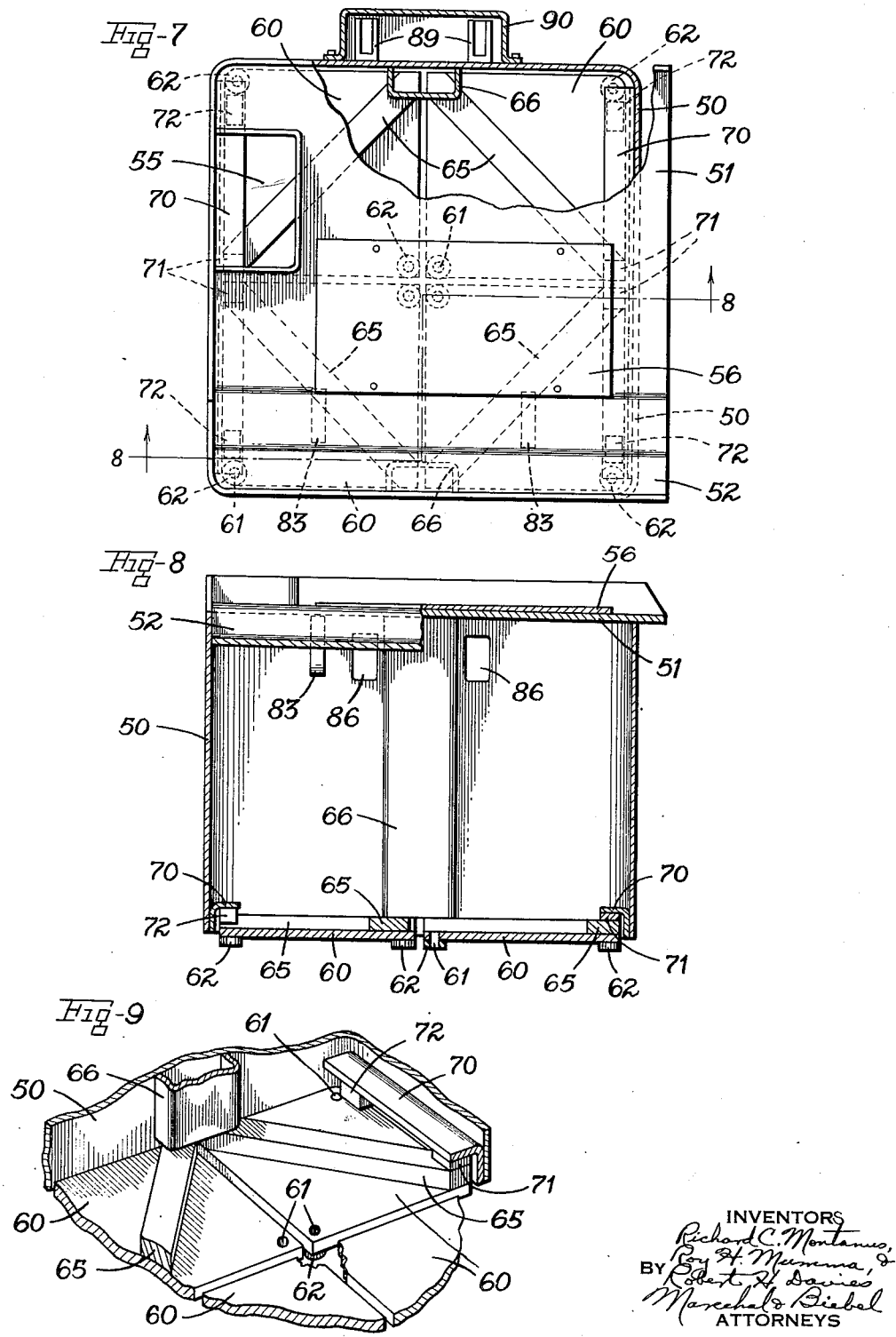

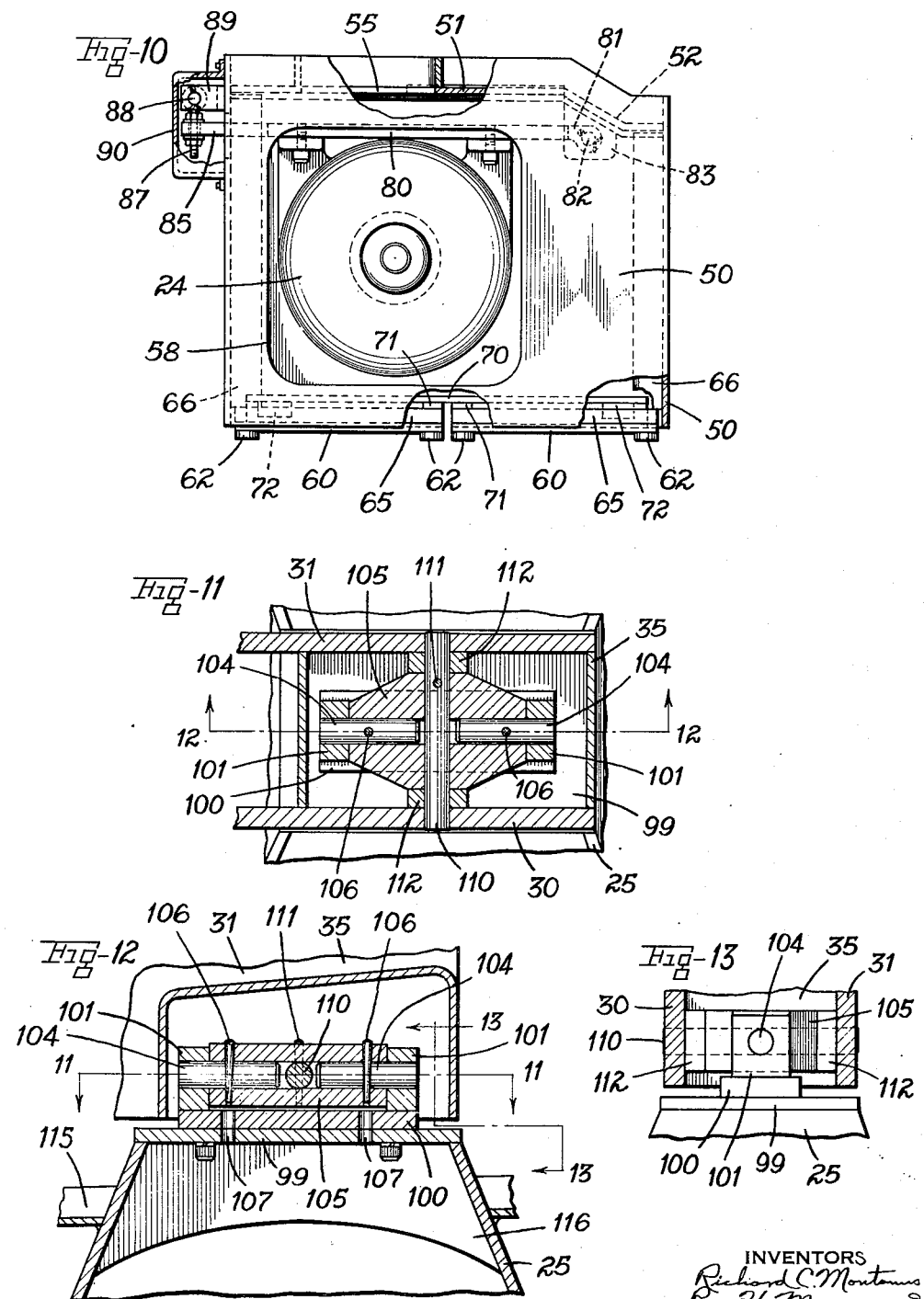

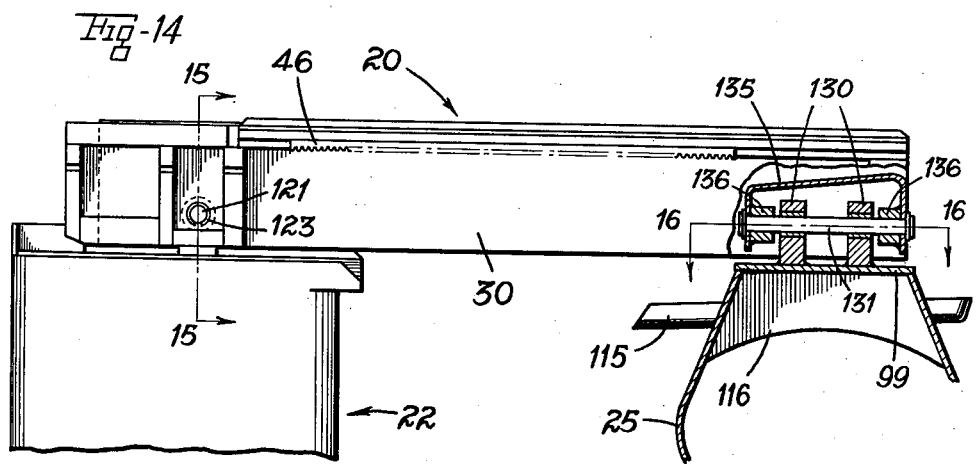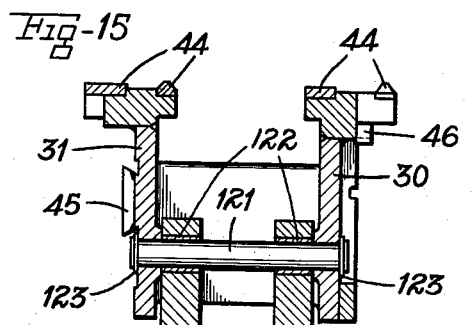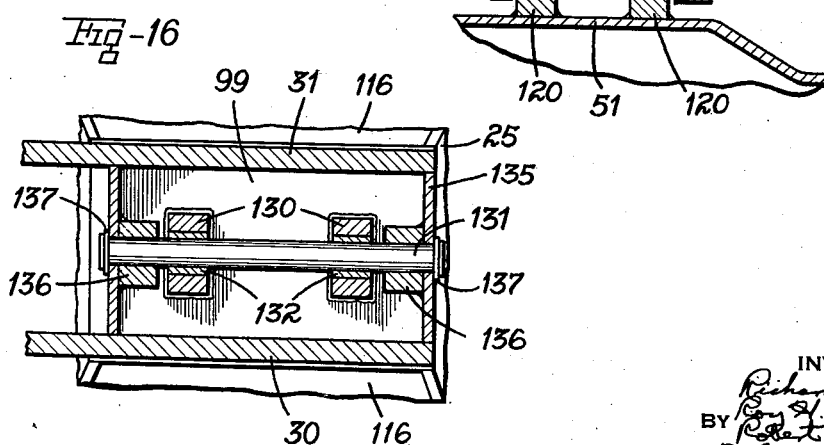

Patented Dec. 16, 1952

2,621,552

UNITED STATES PATENT OFFICE 2,621,552

MACHINE TOOL CONSTRUCTION

Richard C. Montanus, Dayton, Roy H. Mumma, Springfield, and Robert H. Davies, Shaker Heights, Ohio, assignors to The Springfield Machine Tool Co., Springfield, Ohio, a corporation of Ohio Application July 14, 1949, Serial No. 104,662

12 Claims. (Cl. 82—32)

This invention relates to machine tools such as lathes, and more particularly to a mounting for a machine tool which provides protection for the tool in the event of shock, distortion, vibration or other movement of the floor or other surface which supports the tool.

The invention has particular application to a lathe or other machine tool intended for use where it is subject to shock or vibration such as on shipboard, and particularly on warships wherein the deck on which the tool is mounted is subject to severe vibration as well as to twisting, buckling or other distortion caused by the shock of shells or bombs exploding near or on the ship. In the ordinary construction of lathes and similar machine tools it is customary to provide a cast bed and cast legs or supports in the ends of the machine on which the bed is mounted and by means of which the entire machine is bolted to the floor. This construction provides the desired stiffness and rigidity so that the work will be mounted in accurate and uniform relation with respect to the tool, thus contributing to precision operations.

Where a machine of this character is to be mounted on a support which is not stable but is subject to shock, distortion or vibration, such conventional construction is not entirely satisfactory inasmuch as these stresses are transmitted to and produce strains and distortion in the machine itself. As a result the machine may be thrown out of alignment and the difficulty of obtaining precision results materially increased.

In accordance with the present invention a lathe or like machine tool construction is provided in which provision is made for absorbing these distorting forces within the machine and preventing the same from having objectionable effect upon the accuracy of the work. Thus even where the floor on which the machine is mounted vibrates or is unstable, the bed of the machine is so mounted that it remains essentially without objectionable distortion and thus the accuracy of the machine as a whole is not objectionably affected.

It is further desirable in certain machine tool installations, particularly in the case of machines intended for use on board ship, such as warships, to avoid the use of the conventional cast iron construction for the base and the bed, because of the highly brittle nature of such cast constructions. In the event of a near miss, for example, or other severe shock to the deck or surface on which the machine is mounted, such shock may cause fracture of these cast elements, sometimes resulting in breaking loose of large metal sections which then become weapons themselves, particularly where there is a substantial motion to the ship on account of weather or the like. Such large masses of metal may present serious dangers as such, and entirely apart from any external damage from the original shock or shell.

It is accordingly one of the objects of the present invention to provide a machine tool construction adapted for use upon the deck of a ship or other supporting surface subject to distortion, vibration, shock or other movement wherein the bed of the tool is flexibly or resiliently secured to the supporting surface in such manner that it can move with respect to its supporting members in response to movement of the supporting surface to compensate for the movements of the supporting surface without causing undesirable stresses in the bed or its supporting parts.

Another object is to provide such a construction for a machine tool wherein the base supporting one end of the bed is so connected with the supporting surface that the load of the adjacent end of the bed and associated parts is suspended with respect to the supporting surface for deflection in response to movements of the supporting surface.

An additional object is to provide a machine tool construction wherein the supporting base includes one or more separate resilient foot portions which are adapted to be individually secured to a deck or other supporting surface in spaced relation therewith and with each other and which thus act to absorb vibration or other movement of the supporting surface without transmitting undesirable stresses to the remainder of the base and associated parts of the lathe.

It is also an object of the invention to provide a machine tool wherein the leg supporting one end of the bed has a hinged connection to the bed permitting relative movement of the bed and leg about one or more axes to compensate for movements of the supporting surface on which the tool is mounted while maintaining the rigidity and alignment of the bed itself.

Still another object is to provide a machine tool construction such as a lathe in which the major units are of fabricated steel, including the base and supports, and the bed, with the bed in particular being of reinforced construction providing a high degree of stiffness so that it will withstand the distorting forces to which it may be subjected and being so mounted on its supports that these forces are primarily eliminated from the bed, thus retaining its accurate alignment so that work of high accuracy can be consistently turned out and at the same time reducing the possibility of breaking up into large bodies of cast metal, even in the event of severe shock or explosion, and hence having much less tendency to become a weapon in and of itself.

Other objects and advantages of the invention will be apparent from the following description, the accompanying drawings and the appended claims.

In the drawings—

Fig. 1 is a front view of a lathe incorporating a bed and mounting in accordance with the present invention;

Fig. 2 is a perspective view of the lathe bed and its supporting base and leg but with the other portions of the lathe removed;

Fig. 3 is a plan view of the bed;

Fig. 4 is a side elevational view of the bed with its supports shown fragmentarily;

Fig. 5 is a vertical section through the bed taken on the line 5—5 of Fig. 3;

Fig. 6 is a fragmentary perspective view showing the mounting plate for the lathe motor;

Fig. 7 is a plan view of the base at the headstock end of the lathe with the bed removed and with portions broken away to show details of integral construction;

Fig. 8 is a vertical section through the lathe base taken on the line 8—8 of Fig. 7;

Fig. 9 is a perspective view of a fragment of the interior of the lathe base;

Fig. 10 is an end view of the lathe base with portions broken away to illustrate details of internal construction;

Fig. 11 is a view of the gimbal mounting connecting the tailstock end of the lathe bed with its supporting leg, the view being in horizontal section on the line 11—11 of Fig. 12.

Fig. 12 is a vertical section on the line 12—12 of Fig. 11;

Fig. 13 is a fragmentary section on the line 13—13 of Fig. 12;

Fig. 14 is a view similar to Fig. 4 showing somewhat different connections between the ends of the lathe bed and its supporting base and leg;

Fig. 15 is a vertical section on the line 15—15 of Fig. 14; and

Fig. 16 is a horizontal section on the line 16—16 of Fig. 14.

Referring to the drawings, which illustrate preferred embodiments of the invention, Fig. 1 shows a lathe constructed in accordance with the invention wherein the bed indicated generally at 20 has the usual headstock 21 at one end, and this end of the bed is supported by a base indicated generally at 22 which also forms a housing for the drive motor 24 (Fig. 10). The opposite end of the lathe bed is supported by a leg 25, and the usual tailstock 26 is provided at this end of the bed. The carriage 27 is mounted for longitudinal movement along the bed and is shown as incorporating the usual slides, tool support and control handles.

The construction of the bed is shown in detail in Figs. 2 to 5. Instead of the usual cast construction, this bed is fabricated from a plurality of separately formed frame members and cross braces. As shown, the front and back frame members or beams 30 and 31 are welded to opposite ends of an end plate 33 at the headstock end of the bed, and at their opposite ends the beams 30 and 31 are welded to a generally channel-shaped member 35 which also forms a cover for the connection between this end of the bed and the supporting leg 25. Along the intermediate portions of the beams 30 and 31, the bed is reinforced by a plurality of cross braces or plates 40 and 41 welded at their opposite ends to the inner surfaces of the beams. As shown in Fig. 3, the plate 40 adjacent the headstock end of the bed is arranged at substantially right angles to the beams 30 and 31, and the plates or braces 41 are diagonally arranged in zig-zag fashion, with their ends substantially contiguous and with the plate 41 nearest the tailstock end of the bed having its outer end contiguous with the inner vertically arranged portion of the cover member 35.

This construction of the bed has been found to provide a desired high degree of strength and rigidity, particularly from the standpoint of resisting distortion and fracture resulting from the stresses arising under service conditions such as on shipboard wherein the deck or other supporting surface is subject to distortion, vibration and like movements in use. Furthermore, this construction has been found particularly advantageous with the base and leg or other supports for the bed incorporating yieldable elements for absorbing such movements of the supporting surface, a bed constructed as described being effective to maintain the proper rigid alignment of the headstock and tailstock in proper working relation with the carriage and other operating parts of the lathe for accurate precision work without being dependent upon a rigid mounting or connection to the supporting surface. At the same time, it is a simple matter to equip this bed with the usual fittings, including the hardened and ground steel rails 44 for supporting the carriage, and headstock and tailstock the usual bearing 45 at the back of beam 31 for supporting a taper attachment, and the rack 46.

As noted, the supports for the lathe bed incorporate means forming yieldable or resilient connections between the bed and the deck or other supporting surface for absorbing or compensating for movements of this surface, particularly irregular movements such as distortion, vibration and shock incident to the operations of a warship in battle or in rough seas. Referring to Figs. 7 to 10, the base 22 which supports the headstock end of the bed includes a generally rectangular casing 50 having a steel diaphragm 51 welded therein near the top thereof. As shown particularly in Figs. 8 and 10, the diaphragm 51 slopes downwardly to provide for discharge of lubricant, and it terminates along its front edge in a trough 52 arranged to discharge into an oil pan 53 (Fig. 1). An opening 55 is provided in diaphragm 51 for the drive belt for motor 24 and a plate 56 of tapered cross section is welded to the top of diaphragm 51 to provide a level mounting for the adjacent end of the bed, which is shown as secured thereto by bolts 57 (Fig. 4) extending directly into the frame members 30 and 31. Openings 58 and 59 are provided in the casing 50 for access to the motor.

The casing 50 is supported at its lower end by four plates 60 arranged in laterally spaced relation as shown in Fig. 7. Each of these plates is adapted to be bolted at 61 to the deck or other supporting surface through pads 62 welded to the outermost and innermost corners thereof to support the plate and its other pair of diagonally opposite corners in vertically spaced relation with the deck. A diagonally arranged bar 65 is welded to the upper surface of each plate 60 in connecting relation with the unsupported corners of the plate. At the front and back of casing 50, each bar 65 is welded at one end to the lower end of a vertically arranged channel 66 which is welded to the inner surface of casing 50 and at its upper end to the under surface of the diaphragm 51. An angle 70 is welded along the lower edge of casing 50 at the outer and inner ends of the base, and a plurality of spacers 71 are welded to the under surface of the inwardly projecting flange of each of these angles in position to rest on the upper surface of the adjacent ends of the bars 65.

It will thus be seen that the only connection between the casing 50 and the plates 60 is at the junctions of the channels 66 and angles 70 with the ends of bars 65, and since the plates 60 are connected with the deck or other supporting surface only at the other two corners thereof, the casing 50 and the end of the bed mounted thereon are thus effectively suspended with respect to the deck and can move as required to adjust to buckling or other movements of the deck. In this way, shock which might otherwise be transmitted to the bed is effectively absorbed in this flexible and resilient mounting to minimize the danger of breakage of the bed as well as to minimize the possibilities of disconnection between the bed and base. Additional protection or cushioning effect is afforded by pads 72 of resilient oil resistant material secured to the surface of the angle 70 adjacent their outer ends for engaging the upper surface of plates 60 upon movement of casing 50 to damp out oscillations and vibrations. It will be noted in Fig. 9 that the pads 72 terminate short of the outer ends of angle 70 to provide access to the bolt holes 61 through pads 62.

The mounting for the motor 24 within base 22 is shown in detail in Figs. 6 and 10. The motor is bolted to a plate 80 having bracket portions 81 at its forward ends which receive a rod 82 mounted in apertured ears 83 welded to the under surface of diaphragm 50 and extending downwardly therefrom. The motor and motor plate are thus pivotally mounted on rod 82, and an adjustable support is provided at the other end of the mounting plate. Two integral arm portions 85 extend rearwardly from plate 80 and out through slots 86 at the back of casing 50. Eye bolts 87 are adjustably set in these arms 85 and in turn receive a bar 88 supported in yokes 89 welded to the rear surface of casing 50, these yokes being arranged to straddle the heads of the eye bolts. With this construction, the eye bolts can be adjusted as desired to raise or lower the rearward end of the mounted plate with respect to the pivot rod 82 and thus to loosen or tighten the drive belts as required. A cover 90 is shown as bolted to the rear of casing 50 to cover the outer ends of arms 85 and their associated parts.

The tailstock end of the lathe is also supported in such manner as to absorb or damp movements of the deck or other supporting surface without transmitting stresses occasioned by such movements to the bed, and also to provide for such movement of the bed with respect to the supporting surface as may be necessary to accommodate or compensate for relative movements of the base and deck about the resilient mounting for the base as described. The leg 25 at this end of the bed is formed of resilient sheet metal in a generally U-shape. The lower end of this leg is flattened and may be bolted to the deck or other supporting surface by bolts 95 arranged in a line extending transversely of the bed as shown in Fig. 1. It may also be desirable to provide a spacer bar 96 arranged as shown in line with bolts 95 to elevate this lower end of the leg above the deck for more readily flexing under the stresses encountered in use.

A gimbal mounting is provided between the upper end of leg 25 and the adjacent end of the bed to form a yieldable hinged connection between the bed and leg. Referring to Figs. 11 to 13, a plate 99 is welded to the upper ends of leg 25, and a bar 100 is bolted to the upper surface of this plate. Two blocks 101 are welded to the upper ends of bar 100 to form bearings for the outer ends of a pair of shafts 104 extending transversely of the length of the bed. The inner ends of shafts 104 extend into opposite ends of a block 105 and are secured therein as by means of the tapered pins 106, access holes for removing these pins being provided at 107 in plate 99 and bar 100.

A shaft 110 extends through block 105 and is held therein as by means of the tapered pin 111. The outer ends of this shaft 110 are journaled in the frame members 30 and 31 of the bed, and in spacers 112 welded to the inner surfaces of the frame members 30 and 31. The block 105 and bed can thus rock about an axis parallel to the length of the bed as a result of the journaled mountings of the outer ends of shafts 104 in blocks 101, and also the bed can rock transversely of its length about the axis provided by shaft 110. This whole mounting unit is covered by the member 35, and also a trough 115 for lubricant is secured around the upper end of the leg and arranged to discharge into the pan 53. Additional bracing for the upper end of the leg is provided by two plate members 116 welded between the upper ends of the U-shaped portions of the leg and to the under surface of the plate 99.

This gimbal unit provides a secure connection between the bed and the leg 25 which at the same time is adequately flexible to compensate for movement of the deck or other supporting surface on which the lathe is mounted. The portions of shaft 110 journaled in frame members 30 and 31 and blocks 112 and set in block 105 provide extended surfaces for transmitting to block 105 the load of the tailstock and associated portion of the bed, and similar extended supporting surfaces are provided by the portions of shafts 104 which are journaled in blocks 101 and set in block 105. This mounting unit can accordingly adjust itself automatically to irregular movements of the deck to maintain the proper alignment of the bed without undesirable stress or loading of any of the parts. As a result, this construction with the base 22 resiliently supported on the deck, and with the resilient leg 25 yieldably connected with the bed by a gimbal mounting as shown, has been found satisfactory for use on shipboard with heavy duty lathes and even under severe service conditions such as are encountered during rough weather, battle or bombing attack.

Figs. 14 to 16 show a different construction of the lathe in which the bed is provided with pivotal connections at each end thereof to the base 22 and leg 25, with the axes of these connections being at right angles to each other and respectively perpendicular and parallel to the length of the bed. Instead of the bolted connection between the headstock end of the bed and the base shown in Figs. 1–10, two blocks 120 are welded to the upper surface of diaphragm 51, and a shaft 121 is journaled in these blocks by means of bushings 122. The outer ends of the shaft 121 are received in the frame members 30 and 31 of the bed, and are shown as held in place by snap rings 123. This mounting thus provides for movement of the lathe bed about the horizontal axis of shaft 121 transversely of the length of the bed.

At the tailstock end of the lathe, two blocks 130 are welded to the upper surface of plate 99, and a shaft 131 is journaled in these blocks by means of bushings 132. The ends of the shaft 131 are received in the downwardly extending portions at the outer and inner ends of the member 135, which is similar to member 35 in Figs. 3 and 4, reinforcing blocks 136 being shown as welded to the member 135 to strengthen these connections. The ends of the shaft 131 are also shown as provided with snap rings 137 for retaining the same in position. The shaft 131 thus provides for pivotal movement of the adjacent end of the bed about an axis parallel with the length of the bed as required for the bed to adjust to moves of the deck and of the base 22 and leg 25 while maintaining the bed in desired rigid alignment for proper use of the lathe.

While the forms of apparatus herein described constitute preferred embodiments of the invention, it is to be understood that the invention is not limited to these precise forms of apparatus, and that the changes may be made therein without departing from the scope of the invention which is defined in the appended claims.

What is claimed is:

1. A machine tool of the character described adapted for mounting upon a supporting surface subject to distortion, vibration, shock or like movements in use, comprising a bed, a base forming a yieldable mounting for one end of said bed on said surface, a leg for supporting the other end of said bed on said surface independently of said base, and a compound pivotal mounting connecting said leg and said other end of said bed for relative movement about two axes lying respectively parallel and perpendicular to the length of said bed to compensate for movement of said bed about said yieldable mounting, said mounting including a block, a plurality of shafts received within said block and extending outwardly therefrom at substantially right angles to each other with their axes defining a common plane, one pair of opposite ends of said shafts being received in said bed to support said bed for pivotal movement with respect to said block, and means for mounting the other pair of opposite shaft ends on said leg to support said block for pivotal movement with respect to said leg.

2. A machine tool of the character described adapted for mounting upon a supporting surface subject to distortion, vibration, shock or like movements in use, comprising a bed, a supporting base for said bed, said base including a resilient mounting plate, means for securing a diagonally opposite pair of points on said plate to said supporting surface with said plate in vertically spaced relation with said surface, and means for supporting said base on another pair of diagonally opposite points on said plate substantially equidistant from the first named said pair of points to provide for absorbing said movements of said supporting surface.

3. A machine tool of the character described adapted for mounting upon a supporting surface subject to distortion, vibration, shock or like movements in use, comprising a bed, a supporting base for said bed, said base including a plurality of resilient mounting plates arranged in generally coplanar and laterally spaced relation, means for securing a diagonally opposite pair of points on each of said plates to said supporting surface with said plate in vertically spaced relation with said surface, and means for supporting said base on another pair of diagonally opposite points on each of said plates to provide for absorbing said movements of said supporting surface.

4. A machine tool of the character described adapted for mounting upon a supporting surface subject to distortion, vibration, shock or like movements in use, comprising a bed, a base for supporting one end of said bed, said base including a resilient mounting plate, means for securing a diagonally opposite pair of points on said plate to said supporting surface with said plate in vertically spaced relation with said surface, and means for supporting said base on another pair of diagonally opposite points on said plate substantially equidistant from the first named said pair of points to provide for absorbing movement of said surface with respect to said base, a leg for supporting the other end of said bed on said surface independently of said base, and means forming a pivotal connection between said leg and said other end of said bed to provide for movement of said bed with respect to said leg compensating for movements of said base.

5. A machine tool of the character described adapted for mounting upon a supporting surface subject to distortion, vibration, shock or like movements in use, comprising a bed, a base for supporting one end of said bed, said base including a plurality of resilient mounting plates arranged in generally coplanar and laterally spaced relation, means for securing a corresponding diagonally opposite pair of points on each of said plates to said supporting surface with said plate in vertically spaced relation with said surface, means for supporting said base on another pair of diagonally opposite and symmetrically disposed points on each of said plates to provide for absorbing said movements of said supporting surface, and means forming a yieldable connection between the other end of said bed and said surface.

6. In a machine tool of the character described adapted for mounting upon a supporting surface subject to distortion, vibration, shock or like movements in use and including a bed, a base for supporting one end of said bed on said surface, and a leg for supporting the other end of said bed on said surface independently of said base, the combination of means including a plurality of pivot elements forming pivotal connections from the ends of said bed to said base and to said leg, means securing said pivot elements to said bed and to said base and said leg to retain said bed in positively connected relation with said base and said leg preventing relative separation thereof while providing for compensating movement of said bed with respect to both said base and said leg in response to movements of said supporting surface, and said pivotal means having the axes thereof substantially perpendicular to each other.

7. In a machine tool of the character described adapted for mounting upon a supporting surface subject to distortion, vibration, shock or like movements in use and including a bed, a leg for supporting the other end of said bed on said surface independently of said base, the combination of means including a plurality of pivot elements forming pivotal connections from the ends of said bed to said base and to said leg to provide for compensating movement of said bed with respect to both said base and said leg in response to movements of said supporting surface, said pivot elements being arranged to define axes extending respectively parallel and perpendicular to the length of said bed, means for securing said pivotal elements to said bed and to said base and leg to prevent relative separation of said bed from said base and said leg while providing for said compensating movement thereof.

8. A machine tool of the character described adapted for mounting upon a supporting surface subject to distortion, vibration, shock or like movements in use, comprising a bed, a supporting base for said bed, a resilient mounting plate for said base, rigid means for supporting predetermined portions of said plate on said surface and in rigidly vertically spaced relation with said surface providing for downward deflection of other portions of said plate, and means forming a supporting connection between said base and at least one of said downwardly deflectable portions of said plate to support said base in suspended relation with said surface for absorbing said movements of said supporting surface.

9. In a machine tool of the character described adapted for mounting upon a supporting surface subject to distortion, vibration, shock or like movements in use and including a bed, a base for supporting one end of said bed on said surface and a leg for supporting the other end of said bed on said surface independently of said base, the combination of a gimbal mounting connecting said leg and said other end of said bed and including a plurality of pivot elements arranged to provide for movement of said bed with respect to said leg about two axes defined by said pivot elements and arranged at right angles to each other, and means for securing said pivot elements to said leg and said bed to prevent relative separation of said bed and said leg while providing for said relative movement of said bed and said leg in response to said movements of said surface.

10. A machine tool of the character described adapted for mounting upon a supporting surface subject to distortion, vibration, shock or like movements in use, comprising a bed, a leg of upright U-shape and resilient material forming the support for one end of said bed, means for securing the lower end of said leg to said surface with the upwardly extending portions thereof aligned in the direction of the length of said bed for resilient movement generally lengthwise of said bed, means forming a movable connection between the upper end of said leg portions and said one end of said bed, and means independent of said leg forming a yieldable support between the other end of said bed and said surface and cooperating with said movable connection to provide for movement of said bed with respect to said leg compensating for said movements of said supporting surface.

11. A machine tool of the character described adapted for mounting upon a supporting surface subject to distortion, vibration, shock or like movements in use, comprising a bed including a pair of laterally spaced back and front frame members, a supporting base for said bed, a resilient mounting plate for said base, rigid means for supporting predetermined laterally spaced portions of said plate on said surface and in rigidly vertically spaced relation with said surface providing for downward deflection of other portions of said plate, means forming a supporting connection between said base and at least one of said downwardly deflectable portions of said plate to support said base in suspended relation with said surface for absorbing said movements of said surface, means forming a supporting connection between one end of said bed and said base, means for supporting the other end of said bed on said surface independently of said base, and reinforcing members extending laterally between said frame members of said bed to brace said bed against distortion resulting from movement of said surface.

12. A machine tool of the character described adapted for mounting upon a supporting surface subject to distortion, vibration, shock or like movements in use, comprising a bed including a pair of separately formed frame members aligned in spaced relation, a supporting base for said bed, a resilient mounting plate for said base, rigid means for supporting predetermined laterally spaced portions of said plate on said surface and in rigidly vertically spaced relation with said surface providing for downward deflection of other portions of said plate, means forming a supporting connection between said base and at least one of said downwardly deflectable portions of said plate to support said base in suspended relation with said surface for absorbing said movements of said surface, means forming a supporting connection between one end of said bed and said base, means for supporting the other end of said bed on said surface independently of said base, and reinforcing members welded at each end thereof to said frame members of said bed to brace and maintain said frame members in said spaced relation, at least some of said reinforcing members being in diagonally arranged relation with the lengths of said frame members and with each other to maintain said frame members substantially in said spaced alignment not withstanding said movements of said supporting surfaces.

RICHARD C. MONTANUS.
ROY H. MUMMA.
ROBERT H. DAVIES.

REFERENCES CITED

The following references are of record in the file of this patent:

UNITED STATES PATENTS

| Number | Name | Date |
|---|---|---|
| 989,958 | Frahm | Apr. 18, 1911 |
| 1,332,978 | Farmer | Mar. 9, 1920 |
| 1,948,600 | Templeton | Feb. 27, 1934 |
| 1,958,778 | Balduf | May 15, 1934 |
| 2,002,517 | Balduf | May 28, 1935 |
| 2,103,087 | Morris | Dec. 21, 1937 |
| 2,115,824 | McRorey | May 3, 1938 |
| 2,456,959 | LaMont | Dec. 21, 1948 |
| 2,480,526 | Voltz | Aug. 30, 1949 |

FOREIGN PATENTS

| Number | Country | Date |
|---|---|---|
| 287,422 | Great Britain | Mar. 22, 1928 |
| 319,585 | Germany | July 2, 1918 |
| 426,420 | Great Britain | Apr. 3, 1935 |
| 426,434 | Great Britain | Apr. 3, 1935 |
| 716,552 | France | Dec. 23, 1931 |